United States Patent
Lykke et al.

(10) Patent No.: US 12,533,221 B2
(45) Date of Patent: Jan. 27, 2026

(54) METHOD OF REDUCING STRESS LEVEL IN ANIMALS

(71) Applicant: MAREL MEAT A/S, Roskilde (DK)

(72) Inventors: Leif Lykke, Vaerlose (DK); Steen Hegnsgaard Weihe, Morkov (DK)

(73) Assignee: MAREL MEAT A/S, Roskilde (DK)

( * ) Notice: Subject to any disclaimer, the term of this patent is extended or adjusted under 35 U.S.C. 154(b) by 984 days.

(21) Appl. No.: 17/299,449

(22) PCT Filed: Dec. 4, 2019

(86) PCT No.: PCT/EP2019/083639
§ 371 (c)(1),
(2) Date: Jun. 3, 2021

(87) PCT Pub. No.: WO2020/115116
PCT Pub. Date: Jun. 11, 2020

(65) Prior Publication Data
US 2022/0023024 A1    Jan. 27, 2022

(30) Foreign Application Priority Data

Dec. 5, 2018  (EP) .................................... 18210482

(51) Int. Cl.
*A22B 3/00* (2006.01)
*A01K 29/00* (2006.01)
(Continued)

(52) U.S. Cl.
CPC ............... *A61D 7/04* (2013.01); *A01K 29/00* (2013.01); *A22B 3/005* (2013.01); *A61M 16/10* (2013.01);
(Continued)

(58) Field of Classification Search
CPC .... A61M 16/104; A61M 16/04; A61M 16/12; A61M 2250/00; A22B 3/005; A61D 7/04
(Continued)

(56) References Cited

U.S. PATENT DOCUMENTS 5,435,776 A * 7/1995 Owen ..................... A22B 3/005
                                                                    452/66
6,126,534 A * 10/2000 Jacobs ..................... A22B 3/00
                                                                    452/66
(Continued)

FOREIGN PATENT DOCUMENTS

CN    106659171 A    5/2017
CN    206714847 U    12/2017
(Continued)

OTHER PUBLICATIONS

Vimisielansky, "Microclimate in Poultry Houses" Beijing Bureau of Animal Husbandry, Dec. 31, 1981, pp. 5-7.
(Continued)

*Primary Examiner* — David J Parsley
(74) *Attorney, Agent, or Firm* — Workman Nydegger

(57) ABSTRACT

A method of reducing stress level in animals such as pigs may include: sealable enclosing the animals in at least one chamber; exposing the animals to a gas mixture comprising oxygen and at least one type of physiologically inert gas; gradually decreasing the oxygen concentration from a maximum level, to a minimum level; gradually increasing the at least one physiologically inert gas concentration from a minimum level to a maximum level; wherein the minimum level of the oxygen concentration is higher than the anaesthetic causing concentration for the animals.

8 Claims, 2 Drawing Sheets

(51) Int. Cl.
*A61D 7/04* (2006.01)
*A61M 16/10* (2006.01)
(52) U.S. Cl.
CPC ............ *A61M 2016/102* (2013.01); *A61M 2016/1035* (2013.01); *A61M 16/104* (2013.01); *A61M 2202/02* (2013.01); *A61M 2250/00* (2013.01)
(58) Field of Classification Search
USPC ........................................ 452/66; 128/203.12
See application file for complete search history.

(56) References Cited

U.S. PATENT DOCUMENTS

| | | | |
|---|---|---|---|
| 6,174,228 B1 | 1/2001 | Grimsland et al. | |
| 7,377,844 B2 * | 5/2008 | Kildegaard | A22B 3/005 |
| | | | 452/66 |
| 8,323,080 B2 * | 12/2012 | Lang | A22B 3/086 |
| | | | 452/57 |
| 9,017,152 B2 * | 4/2015 | Zanotti | A22B 3/005 |
| | | | 452/57 |
| 9,786,060 B2 | 10/2017 | Schimitzek | |
| 2014/0087643 A1 | 3/2014 | Lang et al. | |
| 2015/0250192 A1 * | 9/2015 | Thulin | G01N 33/0067 |
| | | | 452/57 |
| 2017/0231237 A1 * | 8/2017 | Cheek | A22B 3/005 |
| | | | 452/66 |
| 2017/0249747 A1 | 8/2017 | Schimitzek | |
| 2018/0303871 A1 * | 10/2018 | Ichim | A61P 25/28 |

FOREIGN PATENT DOCUMENTS

| | | |
|---|---|---|
| CN | 108782692 A | 11/2018 |
| DE | 102008003865 B3 | 4/2009 |
| EP | 3369322 A1 | 9/2018 |
| FR | 2914864 A1 | 10/2008 |

OTHER PUBLICATIONS

Chinese Handbook of Common Emergency Care, Feb. 1995, p. 417, ISBN 7-5357-1651-s/R-323.
International Search Report and Written Opinion from PCT Application No. PCT/EP2019/083639, Feb. 27, 2020.
European Search Report from corresponding EP Application No. EP18210482, May 9, 2019.
Gerritzen et al., "Multistage Carbon Dioxide Gas Stunning of Broilers," Poultry Science, vol. 92, Issue 1, Jan. 1, 2013, pp. 41-50.
Third Party Observation for Corresponding European Application No. EP20190812798, Apr. 20, 2024.

* cited by examiner

METHOD OF REDUCING STRESS LEVEL IN ANIMALS

FIELD OF THE INVENTION

The present invention relates to a method of reducing stress level in animals such as pigs. The method for reducing stress level in animals can be a pre-treatment of the animals for at least one subsequent process or it can be a stand-alone method reducing the stress level in animals.

BACKGROUND OF THE INVENTION

Awareness of animal welfare is today highly respected e.g. in abattoirs. As an example, before poultry undergoes a stunning process followed by a subsequent slaughtering process, they are commonly exposed with a blue or bluish light that makes the poultry to fully relax.

Slaughtering highly intelligent animals like pigs is very challenging because of their awareness of their surroundings. There are several steps during the live handling that increases the stress level of pigs. These steps include the step of where the pigs are initially collected from a breeding farm, where they are put into transport vehicle and transported to an abattoir. Another step is where the pigs are unloaded from the vehicle into a large area in an abattoir, where they are kept for some time commonly in groups. Commonly, one of the highest stress level is while the pigs, e.g. 8 pigs in a group, are encouraged with appropriate mechanism or operator to walk towards a stunning device.

For animals like pigs, a lot of study has been made in the last decades to understand the animal behaviour in order to understand what reduces the stress level and what increases the stress level. Example of stress triggering parameters is the surrounding colours, the noise level, smell, light etc. In most abattoirs today these parameters are taken into account with the aim to keep the stress level at minimum.

Despite the effort made today there is still a need to reduce the stress level of e.g. pigs further during said process steps with the aim to reduce the stress level and thus improve further the animal welfare.

SUMMARY OF THE INVENTION

On the above background it is an object of the present invention to provide a method of reducing stress level in animals which may be used for many situations such as before, during and/or after any situation increasing the stress level of one or more animals with the aim of improving overall animal welfare. This may as an example be in situations where a stress reducing treatment of at least one animal may be preferred such as in slaughtering processes.

In general, the invention preferably seeks to mitigate, alleviate or eliminate one or more of the above mentioned disadvantages of the prior art singly or in any combination. In particular, it may be seen as an object of embodiments of the present invention to provide a method that solves the above mentioned problems, or other problems.

To better address one or more of these concerns, in a first aspect of the invention a method is provided of reducing stress level in animals such as pigs, the method comprising:
  sealable enclosing the animals in at least one chamber,
  exposing the animals to a gas mixture comprising oxygen and at least one type of physiologically inert gas,
  gradually decreasing the oxygen concentration from a maximum level, to a minimum level,
  gradually increasing the at least one physiologically inert gas concentration from a minimum level to a maximum level,
  wherein the minimum level of the oxygen concentration is higher than the anaesthetic causing concentration for the animals.

The method is for reducing stress level in animals, not for bringing the animals to a state of lethargy, unconsciousness nor death. Thus the method is not a stunning/anaesthetization process. Animals subjected to the method for reducing stress level, may be any animal species, preferably the animals are farmed animals, such as red-meat animal species e.g. cattle, sheep or pigs.

Accordingly, the fact that the oxygen concentration level is decreased followed the gradual increase in the concentration of the at least one physiologically inert gas, the animals will slowly move towards a state of being more and more relaxed. This will result in that the stress level for the animal will gradually decrease thus the animal welfare is not compromised. The term "subsequent process" may e.g. be understood as a transport process where the animals may be exposed to the gas mixture prior to and possibly also during the transport of the animals to an abattoir, and/or the process may also be understood as/or part of the "waiting" process until stunning where the animals may e.g. be systematically exposed to the gas mixture, and/or the process where the animals move towards a stunning device where they are stunned. Here stunning may be the "subsequent process".

The "subsequent process" may also be e.g. examination and possible treatment by a skilled person such as a veterinarian. This may be at a farm.

By physiologically inert gas is meant any gas being inert for the animals to be treated. Physiologically inert gasses may be e.g. nitrogen, argon, and xenon. It should be noted that carbon dioxide at high concentrations (above about 5% for e.g. pigs, though higher than this for cattle) is not physiologically inert, but rather is toxic, and may also increase the stress level in a number of animal species. In the method described herein carbon dioxide is preferably used in the gas mixture in amounts not increasing the stress level in the treated animals. In a preferred embodiment the concentration of carbon dioxide in the gas mixture is less than 5%, preferably less than 1%, such as less than 0.5%, such as less than 0.1%. This maximum concentration of carbon dioxide in the gas mixture may be higher for cattle, such as less than 21%, such as less than 15%, such as less than 10%.

The oxygen concentration is important in the gas mixture where the minimum level of the oxygen concentration should be higher than the anesthetic-causing concentration for the animals. This means the oxygen concentration should be at a level where the animals are kept alive, conscious and observant (if awake and not sleeping) even if the treatment is performed for a long period. Preferably the animals do not die when exposed to the low oxygen concentration even under prolonged treatment. The minimum oxygen concentration in the gas mixture may differ according to animal species, and may be between 3-10%. Preferably the oxygen concentration is below 10% and above 4%, such as above 5%, such as above 6%. Especially for pigs the oxygen concentration of the gas mixture should preferably be about 6% to secure the animals is in a reduced stress level and not anaesthetized.

An animal in a reduced stress level and not anaesthetized is usually an animal with a regular respiration, which may be slower i.e. with longer intervals than for an active animal. The animal may be lying on the support and still focusing with the eyes i.e. concentrate its attention on the surroundings. The animal may fall asleep, but still not in a state of unconsciousness, if the treatment is performed for a prolonged period.

In one embodiment, the maximum level of oxygen is between 17 to 25%, preferably between 19 to 23%, preferably around 21%.

In one embodiment, the minimum level of oxygen is between 3 to 10%, preferably between 4 to 8%, preferably around 6%.

In one embodiment, the minimal concentration of the at least one physiologically inert gas concentration is between 75 to 83%, preferably between 77 to 81%, preferably around 79%.

In one embodiment, the maximal concentration of the at least one inert gas concentration is between 90 to 97%, preferably between 92 to 96%, preferably around 94%.

In one embodiment, the initial exposed gas mixture is atmospheric air.

In one embodiment, the at least one physiologically inert gas comprises $N_2$ gas and/or Ar.

In one embodiment, the gas mixture comprises $CO_2$ and where the concentration of the $CO_2$ is in the range from 0.1% up to a maximum concentration level, where the maximum concentration level is lower than the anaesthetic causing concentration level for the animals. This maximum $CO_2$ concentration level is lower than 21%.

Preferably the gas concentrations are calculated based on weight.

In one embodiment the at least one chamber may be a room where the animals live, or a room or chamber where the animals wait for a further process. The at least one chamber may be the transport enclosure on a transport lorry. The at least one chamber may also be a chamber located prior to a stunning equipment or being part of a stunning equipment. In a chamber for reducing stress level of at least one animal, the gas mixture may be supplied to the chamber enclosing the at least one animal and the minimum level of oxygen and the maximum level of the at least one inert gas may be maintained in the chamber for a period. Such a chamber may be a stand-alone chamber or it may be located before or be a part of an equipment for performing a subsequent process, such as being located before or being a part of a stunning equipment.

In another embodiment, the at least one chamber extends from a first position where the animals are received to a second position where the at least one subsequent process takes place, where the exposure to the gas is while the animals move from the first position towards the second position, the first position being the position where the concentration of the oxygen is maximum and where the concentration of the at least one inert gas is minimum, the second position being the position where the concentration of the oxygen is minimum and the concentration of the at least one inert gas is maximum. As an example, the first position may be a holding area position where animals are e.g. in groups entered into the at least one chamber, where appropriate mechanism encourage the animals to move, or automatically moves them, towards the second position, such that upon reach at the second position, the relaxation level has reached maximum. As an example, at the second position there may be a stunning device, i.e. when reaching the second position the animals may be transferred into the stunning device.

In another embodiment, the step of exposing the animals to the gas mixture is while the animals are standstill.

BRIEF DESCRIPTION OF THE DRAWINGS

Embodiments of the invention will be described, by way of example only, with reference to the drawings, in which.

DESCRIPTION OF EMBODIMENTS

Figure 1:
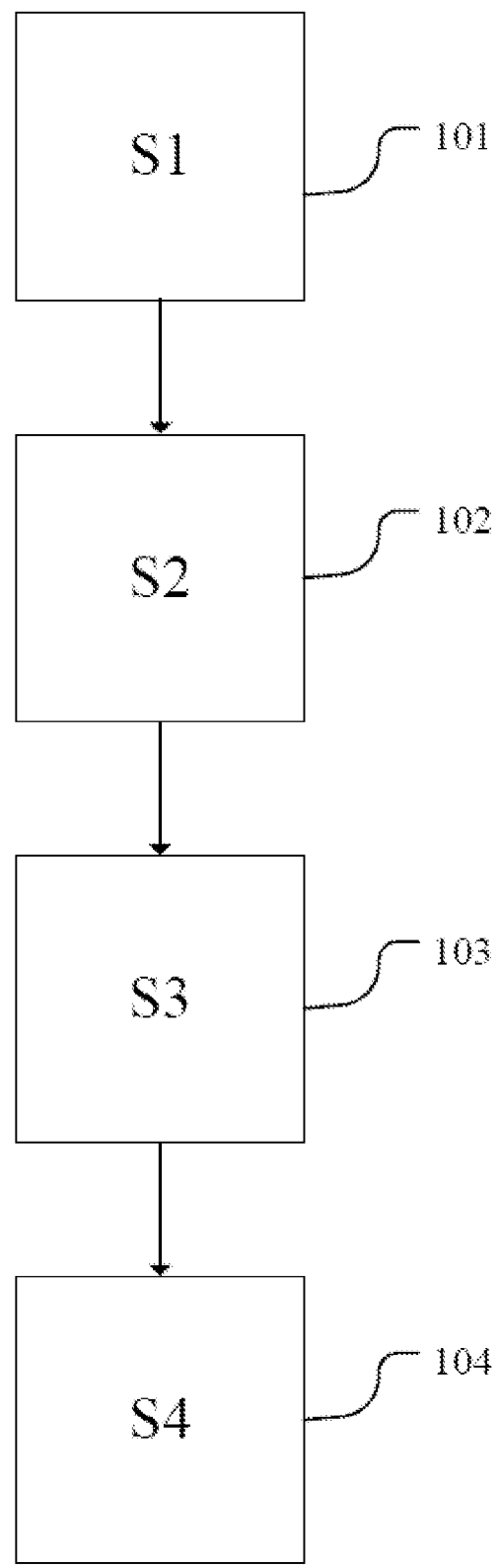
FIG. 1 shows a flowchart of a method according to the present invention.

FIG. 1 is a flowchart of a method according to the present invention to reduce stress level in animals such as pigs for at least one subsequent process.

In step (S1) 101, the animals are sealable enclosed in at least one chamber. In one embodiment, the chamber may be considered as a space where e.g. few animas at a time, e.g. a pre-fixed number or number range of animals, is standing more or less stationary. In another embodiment, the at least one chamber extends from a first position where the animals, e.g. a pre-fixed number or number range, are received to a second position where the at least one subsequent process takes place.

In a second step (S2) 102, the animals are exposed to a gas mixture comprising oxygen and at least one type of physiologically inert gas.

In a step (S3) 103, the oxygen concentration level is gradually decreased from a maximum level, to a minimum level.

In a step (S4) 105, the concentration level of the at least one physiologically inert gas is gradually increased from a minimum level to a maximum level.

The minimum level of the oxygen concentration is selected such that it is higher than the anaesthetic-causing concentration for the animals.

In one embodiment, the maximum level of oxygen is between 17 to 25%, preferably between 19 to 23%, preferably around 21%. In another embodiment, the minimum level of oxygen is between 3 to 10%, preferably between 4 to 8%, preferably around 6%. In still another embodiment, the minimal concentration of the at least one physiologically inert gas concentration is between 75 to 83%, preferably between 77 to 81%, preferably around 79%. In yet another embodiment, the maximal concentration of the at least one physiologically inert gas concentration is between 90 to 97%, preferably between 92 to 96%, preferably around 94%. In an embodiment, the initial exposed gas mixture is atmosphere.

Figure 2:
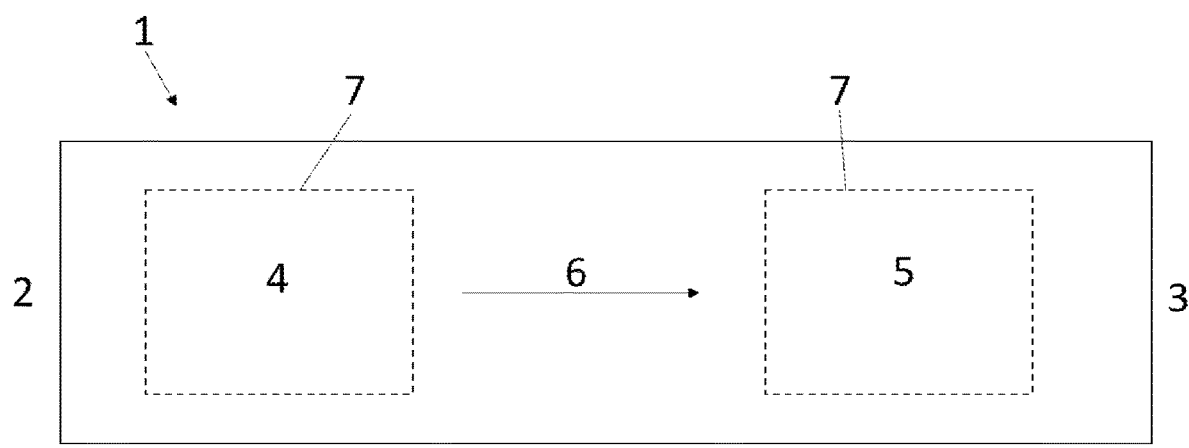
FIG. 2 shows one type of a chamber wherein the method according to the present invention may be performed.

Referring to the embodiment above, the exposure to the gas while the animals are standstill, or while they move from the first position towards the second position, the first position is the position where the concentration of the oxygen is maximum and where the concentration of the at least one inert gas is minimum. The second position is the position where the concentration of the oxygen is minimum and the concentration of the at least one physiologically inert gas is maximum FIG. 2 illustrates ways of performing the method to reduce stress level in animals. Here the method is performed in a sealable chamber (1) with an openable inlet area (2) and an openable outlet area (3). The chamber extends at least from a first position (4) to a second position (5). Animals (not shown) can be positioned into a transport chamber (7). The transport chamber (7) is initially located in the first position (4) with a maximum oxygen concentration and a minimum concentration of at least one physiologically inert gas. The transport chamber (7) is transported as indicated by arrow (6) from the first position (4) to the second position (5) and during this transport the gas mixture can be changed such that in the second position (5) there is a minimum oxygen concentration and a maximum concentrating of at least one physiologically inert gas. The animals may be in a reduced stress level when the transport chamber (7) reaches the second position (5) or the animals may be in a reduced stress level after the transport chamber (7) has been located for a period in the second position (5).

The sealable chamber (1) may be a stand alone equipment, The sealable chamber (1) may also be located next to an equipment where the animals are subjected to a subsequent process. This subsequent process may be stunning in a stunning equipment. The sealable chamber (1) may also be an integrated part of an equipment where the animals are subjected to a subsequent process, such as a stunning equipment for stunning the animals. This subsequent process (e.g. stunning) may take place at the second position (5), which requires the gas inlet is controlled such that the animals are in a reduced stress level when reaching the second position (5). In the figure the sealable chamber (1) is illustrated as being horizontally arranged, though it may also be vertically arranged or inclined up-wardly or inclined down-wardly and where the transport chamber (7) in a vertically arrangement can be moved down-wards and/or up-wards, and up-wardly or down-wardly if the sealable chamber (1) inclines up-wardly or inclines down-wardly, respectively.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of reducing stress level in animals, the method comprising:
sealable enclosing the animals in at least one chamber,
exposing the animals to a gas mixture comprising oxygen and at least one type of physiologically inert gas,
gradually decreasing oxygen concentration from a maximum level to a minimum level,
gradually increasing the at least one physiologically inert gas concentration from a minimum level to a maximum level, and
avoiding bringing the animals to a state of unconsciousness or death by the gas mixture throughout the at least one chamber;
wherein the minimum level of the oxygen concentration is higher than an anesthetic causing concentration of oxygen for the animals,
wherein the maximum level of the at least one physiologically inert gas concentration is between 90 to 97%, and
wherein the gas mixture comprises a $CO_2$ concentration lower than 5%;
wherein the at least one chamber extends from a first position where the animals are received to a second position where at least one subsequent process takes place, where exposure to the gas is while the animals move from the first position towards the second position, the first position being the position where the concentration of the oxygen is maximum and where the concentration of the at least one physiologically inert gas is minimum, the second position being the position where the concentration of the oxygen is minimum and the concentration of the at least one physiologically inert gas is maximum; and
wherein the at least one subsequent process includes at least one of a transport process, an examination process, and a treatment process.

2. The method according to claim 1, wherein the maximum level of oxygen is between 17 to 25%.

3. The method according to claim 1, wherein the minimum level of oxygen is between 3 to 10%.

4. The method according to claim 1, wherein the minimum level of the at least one physiologically inert gas concentration is between 75 to 83%.

5. The method according to claim 1, wherein an initial exposed gas mixture is atmospheric air.

6. The method according to claim 1, wherein the at least one physiologically inert gas comprises $N_2$ gas and/or Ar.

7. The method according to claim 1, wherein the $CO_2$ concentration of the gas mixture is in the range from 0.1% up to a maximum concentration level, wherein the maximum concentration level is lower than an anesthetic causing concentration of $CO_2$ for the animals.

8. The method according to claim 1, wherein exposing the animals to the gas mixture is while the animals are standstill.

* * * * *